(12) United States Patent
Deczky

(10) Patent No.: US 7,369,566 B2
(45) Date of Patent: May 6, 2008

(54) METHOD AND SYSTEM FOR DSL POWER SAVING

(75) Inventor: Andrew Deczky, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 1023 days.

(21) Appl. No.: 10/274,820

(22) Filed: Oct. 18, 2002

(65) Prior Publication Data

US 2003/0118089 A1 Jun. 26, 2003

(30) Foreign Application Priority Data

Oct. 19, 2001 (CA) .................................. 2359305

(51) Int. Cl.
*H04Q 11/02* (2006.01)
*H04B 1/38* (2006.01)

(52) U.S. Cl. ...................... 370/430; 375/222

(58) Field of Classification Search ........ 370/401–406, 370/535–543, 486, 465–466; 725/105; 375/222
See application file for complete search history.

(56) References Cited

U.S. PATENT DOCUMENTS

| | | | |
|---|---|---|---|
| 5,960,327 A * | 9/1999 | Eaton et al. ............... | 340/7.37 |
| 6,028,486 A | 2/2000 | Andre | |
| 6,035,000 A | 3/2000 | Bingham | |
| 6,192,109 B1 * | 2/2001 | Amrany et al. ............... | 379/30 |
| 6,266,348 B1 | 7/2001 | Gross et al. | |
| 6,839,889 B2 * | 1/2005 | Liu .............................. | 716/18 |
| 7,027,405 B1 * | 4/2006 | Khadavi ...................... | 370/244 |
| 2002/0080867 A1 * | 6/2002 | Abbas et al. ................ | 375/222 |

OTHER PUBLICATIONS

G.gen, G.dmt.bis, G.lite.bis: Protocol for On-Line Reconfiguration of ADSL. ITU-Telecommunication Standardization Sector, Study Group 15, Temporary Document SC-060. San Francisco, CA, US, Aug. 6-10, 2001; pp. 1-10. Source: Texas Instruments (Contact: Doug Artman (1-408-879-2085) and Ben Wiseman (1-408-879-2105), Texas Instruments.

* cited by examiner

*Primary Examiner*—Wing Chan
*Assistant Examiner*—Hong Sol Cho
(74) *Attorney, Agent, or Firm*—Clements Bernard Miller; Christopher L. Bernard; Tyler S. Brown

(57) ABSTRACT

Method and system for reducing power dissipation for data transmission from a transmitter to a receiver in a digital subscriber line (DSL) system when a rate of available data is below a first predetermined data rate for a predetermined length of time. The method includes the following steps. Normal parameters for a normal rate of said data transmission are stored. New parameters for a reduced rate of the data transmission are calculated. Data is transmitted at the reduced rate of the data transmission, wherein the reduced rate requires less power for data transmission. The normal rate of the data transmission is resumed using the normal parameters when the rate of available data rises above a second predetermined data rate.

21 Claims, 1 Drawing Sheet

METHOD AND SYSTEM FOR DSL POWER SAVING

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates generally to saving power in digital subscriber line (DSL) modems, and specifically to a level two method and system for providing power savings.

Remote access and retrieval of data is becoming increasingly popular in data communication. The proliferation of the Internet has provided a vast network of information that is available to the general public. As the Internet grows and technology advances, this information is becoming increasingly voluminous and the details are becoming increasingly intricate. The increase in volume of information to be transferred has presented a need for a high-speed Internet connection, since traditional telephone modems communicate at speeds too slow for efficient communication.

One proposal for high-speed communication is the introduction of digital subscriber line (DSL) technology. One of the most attractive features of DSL is that it is implemented using an infrastructure that already exists. DSL shares copper twisted pair lines typically used for telephone communication. However, only a small portion (0 to 4 kHz) of bandwidth on the twisted pair line is used for Plain Old Telephone Service (POTS). DSL takes advantage of additional available bandwidth (from 4 kHz to approximately 1.1 MHz) for transmitting data. There are various forms of DSL, generally referred to as xDSL, including Asymmetric DSL (ADSL), High bit-rate DSL (HDSL), Symmetric DSL (SDSL), Symmetric High bit-rate DSL (SHDSL), Integrated Services Digital Network (ISDN) DSL systems and the like.

ADSL is currently the most practical form of DSL technology, and therefore the most widely implemented. ADSL is asymmetric in that its downstream (to a subscriber) capacity is larger than its upstream (from the subscriber) capacity. An ADSL transceiver unit at a central office or remote loop carrier (ATU-C) is used for sending downstream information and receiving upstream information. An ADSL transceiver unit at a remote location or user end (ATU-R) is used for receiving downstream information and sending upstream information. Typically, a Discrete Multitone (DMT) scheme is used. The spectrum from 4 kHz to 1.1 MHz is divided into 255 sub-channels, or tones, each having a bandwidth of 4.3125 kHz. Each sub-channel uses Quadrature Amplitude Modulation (QAM) to carry 1 to 15 bits per QAM symbol. When the modems initialize at power-up they attempt to train and synchronize their signals with the other side.

It is of great interest for DSL service providers to achieve power saving on DSL line cards on the central office (CO) side. The benefit of power saving translates into higher line density, less stringent power supply and heating requirements, and a smaller installation footprint, which are especially important for remote DSL deployment.

There are presently two underlying approaches for quiescent-mode (Q-mode), which is a transparent power savings mode. The first approach is referred to as a suspended operation approach. The second approach is referred to as a free-running operation approach. Each of these approaches and their shortcomings are outlined in the following paragraphs.

For the suspended operation approach, all of the clocks, registers, interleavers, states, and the like in higher layers are frozen upon entry into Q-mode, and are restarted upon exit. During operation in Q-mode, a special low power Q-mode signal is transmitted in place of the user data modulated signal. There are a number of problems associated with the above proposals. There is an uncertainty to the amount of power reduction actually obtained. A drift in frequency domain equalizer is possible due to a difference in the Q-mode signal as compared to a Showtime signal. A correlator and a synchronized pseudo-random binary sequence (PRBS) generator are needed at a receiver to detect an exit signal. The transmitter needs to communicate the Q-mode line signal to the receiver during initialization. Lastly, there are questions about the robustness of the approach's exit mechanism.

For the free-running approach, the transmission communication (TC) layers are modified to generate an all zero sequence when there is no data to transmit. The physical (PMD) layer transmits a low power QPSK signal in response to the unscrambled, all zero sequence. Exit is via a special symbol, and resynchronization between the transmitter and receiver is allowed if an exit message is missed. However, a drawback to the free-running approach is the need to modify all of the transmission communication (TC) layers to generate an all zero sequence when there is no data to transmit. This results in additional coupling between the physical and TC layers, which is preferable to avoid. In addition, the position of the data scrambler has to be moved to allow the all zero data signal at the PMD layer.

Thus, it is an object of the present invention to provide a method and system for providing a power savings that obviates or mitigates at least some of the above mentioned disadvantages.

SUMMARY OF THE INVENTION

In accordance with an aspect of the present invention, there is provided a method for reducing power dissipation for data transmission from a transmitter to a receiver in a DSL system when a rate of available data is below a first predetermined data rate for a predetermined length of time. The method includes the following steps. Normal parameters for a normal rate of said data transmission are stored. New parameters for a reduced rate of the data transmission are calculated. Data is transmitted at the reduced rate of the data transmission, wherein the reduced rate requires less power for data transmission. The normal rate of the data transmission is resumed using the normal parameters when the rate of available data is above a second predetermined data rate.

In various embodiments, the new parameters are calculated at both the transmitter and the receiver, are calculated at the transmitter and communicated to the receiver, or are calculated at the receiver and communicated to the transmitter.

BRIEF DESCRIPTION OF THE DRAWINGS

Embodiments of the present invention will now be described by way of example only with reference to the following drawings in which:

For convenience, like numerals in the description refer to like structures in the drawings. Referring to FIG. 1, a generic ADSL system is illustrated generally by numeral 100. The ADSL system 100 comprises a network 102, an ATU-C 104, an ATU-R 106, a terminal 108, and a link 110. The ATU-C 102 is located at either a central office (CO) or remote loop carrier and coupled to the network 102. Typically, the network 102 is the Internet. The ATU-C 104 is further coupled to the ATU-R 106 via the link 110. Typically, the link 110 is a twisted pair line. The ATU-R 106 is located at customer premises equipment (CPE) or remote terminal (RT) and is coupled to the terminal 108. Typically, the terminal is a personal computer (PC). Data flowing from the ATU-C 104 to the ATU-R 106 is said to be flowing downstream. Data flowing from the ATU-R 106 to the ATU-C 104 is said to be flowing upstream. The above system is standard in the art, and a person skilled in the art will appreciate that there are various implementations of an ADSL system.

The following description details a level-two (L2) power saving mode for the ADSL system 100. The L2 power saving mode is used primarily for the downstream direction. This The general concept behind the L2 power saving mode is to detect when the ATU-C has no data to send on one or more latency paths. If there is no data to send, the data rate can be reduced and the power transmitted will be reduced accordingly. The data rate reduction is performed in discrete steps, allowing a simple process to define a new set of bits $b_i$ and fine gain $g_i$ parameters for a carrier $c_i$. The process further defines a corresponding lower transmission rate for the transmitter. A power reduction is derived from the reduced transmit level, which is determined digitally by scaling reduced constellations via the fine gains $g_i$ while gains of transmit and receive analog chain are kept constant.

Figure 1:
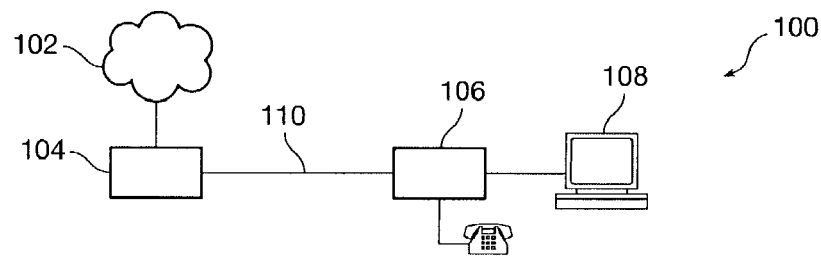
FIG. 1 is a block diagram illustrating an ADSL system.
Figure 2:
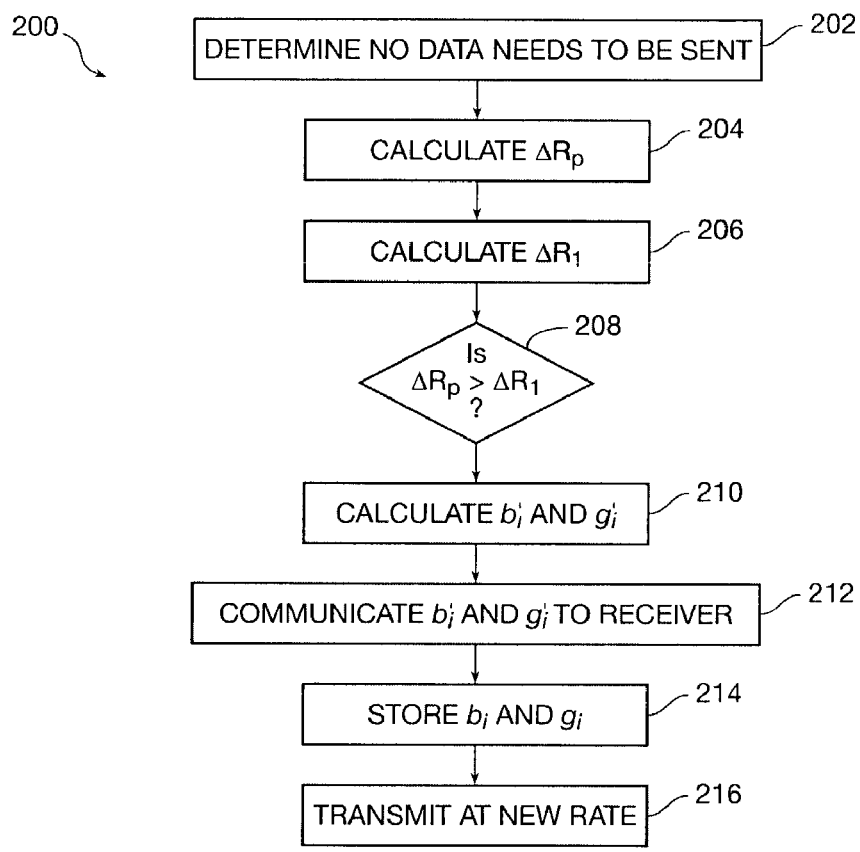
FIG. 2 is a flow chart of a method for entering Q-mode.

Referring to FIG. 2, a process for entering L2-mode is illustrated generally by numeral 200. When the CO determines that it has had no data to transmit on one or more of its latency paths p for a predetermined time period (step 202), it computes a resulting possible reduction in payload, or data rate, $\Delta R_p$ (step 204). $\Delta R_p$ is determined as the sum of the rates assigned to the latency paths that no longer have data to transmit, lower bounded by a minimum transmit data rate that is set by an operator of the system. Once the possible reduction in data rate $\Delta R_p$ is determined, it is compared to $\Delta R_1$ (step 208), which is calculated in accordance with the equation $\Delta R_1 = 4\Sigma j$ kbits/sec (step 206), where j=1 if ($b_i$>1) and j=0 if ($b_i$=1). The summation operates over the range i from 0 to imax, where i is the bin index and imax is the maximum bin index present.

If $\Delta R_p > \Delta R_1$ (step 208), the rate is reduced by a multiple of $\Delta R_1$ kbits/sec. This is achieved by determining reduced bits $b_i'$ and fine gains $g_i'$ parameters (step 210) as follows. The bits $b_i$ are reduced by a fixed number of bits $\Delta b$ such that $\Delta b = \text{int}(\Delta R_p/\Delta R_1)$, where $\Delta b < \Delta b_{max}$ and $\Delta b_{max}$ is defined by an operator of the system. Then, if the number of bits $b_i$ per carrier $c_i$ is greater than $\Delta b$, the number of bits per carrier is adjusted in accordance with the equation $b_i' = b_i - \Delta b$. If, however, the number of bits $b_i$ per carrier $c_i$ is less than $\Delta b$, the number of bits per carrier is set to 1 in accordance with the equation $b_i' = 1$. Generally, the preferred values for $\Delta b$ are 1, 2, 3, and 4, although there is no theoretical upper limit except that $\Delta b$ is less than $\Delta b_{max}$.

The fine gains $g_i$ are adjusted in accordance with the number of bits per carrier $b_i$ and the change in number of bits $\Delta b$. If the number of bits $b_i$ per carrier $c_i$ is greater than $\Delta b$, the fine gains per carrier are adjusted in accordance with the equation $g_i' = g_i - \Delta g$. If, however, the number of bits $b_i$ per carrier $c_i$ is less than $\Delta b$, $\Delta b$ is redefined as $b_i - 1$ for the purpose of calculating $\Delta g$. The fine gains per carrier are set in accordance with the equation $g_i' = g_i - \Delta g$, where $\Delta g$ is measured in dB and $\Delta g$ is defined in accordance with $b_i$ and $\Delta b$ as illustrated in Table 1 below.

TABLE 1

$\Delta g$ values as a function of $b_i$ and $\Delta b$

|  | $\Delta b = 1$ | $\Delta b = 2$ | $\Delta b = 3$ | $\Delta b = 4$ |
| --- | --- | --- | --- | --- |
| $b_i \geq 8$ | −3 | −6 | −9 | −12 |
| $b_i = 7$ | −3 | −6 | −9 | −11 |
| $b_i = 6$ | −3 | −6 | −8 | −13 |
| $b_i = 5$ | −3 | −5 | −10 | −13 |
| $b_i = 4$ | −2 | −7 | −10 |  |
| $b_i = 3$ | −5 | −8 |  |  |
| $b_i = 2$ | −3 |  |  |  |

The maximum bit reduction $\Delta b_{max}$ per carrier allowed, the predetermined delay before entering L2-mode (L2del), and a predetermined delay before re-entering L2-mode after an exit (L2rept), are variable and are determined by an operator of the system.

The new parameters $b_i'$ and $g_i'$ can be computed a plurality of different ways. The following are three examples for calculating the parameters $b_i'$ and $g_i'$. In a first example, $b_i'$ and $g_i'$ are computed at both the ATU-C and the ATU-R in accordance with the values of $\Delta R_p$ and $\Delta b_{max}$, which are transmitted from the ATU-C to the ATU-R. In a second example, $b_i'$ and $g_i'$ are computed at the ATU-C and transmitted from the ATU-C to the ATU-R (step 212). In a third example, the values of $\Delta R_p$ and $\Delta b_{max}$ are transmitted from the ATU-C to the ATU-R and $b_i'$ and $g_i'$ are computed at the ATU-R accordingly. The results are then transmitted from the ATU-R to the ATU-C. The transmission of the $b_i'/g_i'$ table is accomplished using standard OLR messages as defined below. Preferably, the normal parameters $b_i$ and $g_i$ are stored at both the ATU-C and the ATU-R (step 214). These parameters are computed at the ATU-C. The ATU-C then proceeds to transmit at the reduced rate 216 defined by the new parameters (step 216).

Figure 3:
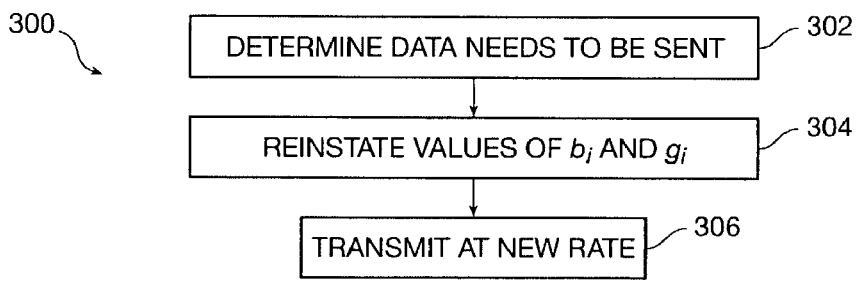
FIG. 3 is a flow chart of a method for exiting Q-mode.

Referring to FIG. 3, a process for exiting L2-mode is illustrated generally by numeral 300. Once the CO determines that there is data to transmit on one or more of its latency paths that were idle in Q-mode (step 302), the parameters revert back to the original values for the bits $b_i$ and gains $g_i$ per carrier $c_i$ (step 304). Returning to these parameters results in a return to the original, latency path data rate $L_p$, thus restoring the bandwidth to the full rate that existed prior to entering L2-mode (step 306). In the present embodiment, the original parameters are stored at both the ATU-C and the ATU-R. Alternately, it is possible to store the parameters at either ATU-C or ATU-R and communicate the data between them when it is needed.

The actual process of entering and exiting L2-mode uses an extension to protocols developed for on-line reconfiguration (OLR) as described in a document by D. Artman and B. Wiseman, titled "Protocol for on line reconfiguration of ADSL" ITU-T SG15/L24, SC-060, Aug. 2001, which is hereby incorporated by reference.

A brief summary of the protocol described by Artman and Wiseman as it is applied to the present invention is described as follows. The protocol is used for control of OLR based at the physical layer and relates to relevant actions including bit swapping, dynamic rate repartitioning, and seamless rate adaptation. The protocol comprises three specific messages including an OLR Request Message, an OLR Deny Message, and an OLR Grant Message, which are transmitted between the ATU-C and the ATU-R via an overhead channel. The OLR Request Message is used for requesting a specific OLR action from a transmitting ATU to a receiving ATU. The OLR Deny Message is used for denying the OLR Request Message and optionally providing information as to why the request is denied. The OLR Grant Message is used for positively acknowledging the OLR Request Message.

For the present embodiment, two new OLR request types in the downstream direction are defined. When the downstream transmitter determines that it has had no data to transmit on one or more of its latency paths for a predetermined time period and that $\Delta b$ provides a minimum power saving as defined by an operator, the CO sends an OLR Request Message L2enter to the CPE to enter L2-mode. In the case of the second example described above, wherein the ATU-C calculates $b_i'$ and $g_i'$ and transmits them to the ATU-R, the values of $b_i'$ and $g_i'$ are included in this message. The CPE answers this with an OLR Message L2grant. In the case of the third example described above, wherein the ATU-R calculates $b_i'$ and $g_i'$ and transmits them to the ATU-C, the values of $b_i'$ and $g_i'$ are included in this message. When the CO determines that there is data to be transmitted, it sends an OLR message L2exit to exit L2-mode. This message may be followed by a flag to synchronize a return to full transmission $L_0$ state.

In an alternate embodiment, a fast L2-mode exit is achieved using specially defined physical symbol waveforms instead of messages through an overhead channel, as described above. Such symbol waveforms include inverting the last Showtime symbol, or using Reverb/Segue or Sync/inverted-Sync symbols over a predetermined number of symbols. In the present embodiment, the preferred number of symbols is two. The receiver then looks for this sequence to determine and synchronize exit from L2 mode.

In another alternate embodiment, a fast L2-mode exit is achieved by sending a special exit bit sequence and/or its inverted version through a regular L2-mode data channel. The exit bit sequence can be a fixed pre-defined sequence or can be defined dynamically to fit into one L2-mode symbol. The ATU-R is informed of the exit sequence during L2-mode entry through the overhead channel.

The embodiments above describe a new, robust L2 power saving mode that addresses the concerns of the prior art. A form of on-line rate adaptation is used for reducing the transmission power when there is little or no information to transmit. The bits $b_i$ and fine gain $g_i$ parameters are modified in a deterministic way, thereby reducing the overall rate of the modem and, as a consequence, the transmit power.

There are numerous advantages provided by this power saving scheme. These advantages include the following points. The power reduction comes from a reduced root mean square RMS voltage as well as a reduced peak voltage at the driver. The modem is running during Q-mode with all the bins defined for Showtime, making Frequency Domain Equalizer (FDE) adaptation possible. Higher layers of the modem need not be frozen. The overhead channel is running, allowing messaging to occur between the CO and the CPE. Network timing references (NTRs) can still be maintained. Lastly, little new capability is required other than that already defined for OLR.

The processes performed by the DSL equipment as described above with reference to FIGS. 2 and 3 may be implemented by various hardware, software, firmware, programmable logic, or combinations thereof. According to one embodiment, the processes of FIGS. 2 and 3 are implemented as additional extensions to the standard structures that implement the standard DSL processes. For example, when the standard DSL processes are performed by software or firmware executed by a processor, the processes of FIGS. 2 and 3 may be implemented by additional software or firmware executed by the processor. In such a case the DSL equipment may include additional hardware as desired.

Although the invention has been described with reference to certain specific embodiments, various modifications thereof will be apparent to those skilled in the art without departing from the spirit and scope of the invention as outlined in the claims appended hereto.

What is claimed is:

1. A method for reducing power dissipation for data transmission from a transmitter to a receiver in a digital subscriber line (DSL) system when a rate of available data is below a first predetermined data rate for a predetermined length of time, said method including the steps of:
    storing normal parameters for a normal power and rate of said data transmission, wherein the DSL system is configured to operate protocols developed for on-line reconfiguration comprising additional on-line reconfiguration messages for entering and exiting layer two power saving mode;
    calculating new parameters for reduced power and a reduced rate of said data transmission, wherein the new parameters comprise bits per carrier and gains per carrier, and wherein the calculation of new parameters is based upon a deterministic calculation;
    communicating said new parameters between said transmitter and said receiver via an on-line reconfiguration message;
    transmitting data at said reduced power and reduced rate of said data transmission responsive to said new parameters, wherein said reduced rate requires less power for data transmission; and
    resuming said normal power and rate of said data transmission using said normal parameters when said rate of available data is above a second predetermined data rate.

2. A method as defined in claim 1, wherein said data is transmitted at said reduced power and reduced rate when it is determined that a reduction in power may be achieved at said reduced power and reduced rate.

3. A method as defined in claim 1, wherein said normal parameters are stored at said transmitter.

4. A method as defined in claim 1, wherein said normal parameters are stored at said receiver.

5. A method as defined in claim 1, wherein said normal parameters are stored at both said transmitter and said receiver.

6. A method as defined in claim 1, wherein said new parameters are calculated at said transmitter and transmitted to said receiver.

7. A method as defined in claim 1, wherein said new parameters are calculated at said receiver and transmitted to said transmitter.

8. A method as defined in claim 1, wherein said new parameters are calculated at both said transmitter and said receiver.

9. A method as defined in claim 1, wherein said new parameters are calculated by:
   determining an available bandwidth of said data transmission;
   calculating whether said available bandwidth is below a predefined threshold;
   reducing a number of said bits per carrier in accordance with said available bandwidth; and
   reducing a number of said gains per carrier in accordance with said reduced number of bits per carrier and said available bandwidth.

10. A method as defined in claim 1, wherein said bits per carrier and said gains per carrier are communicated between said transmitter and said receiver via a first message between said transmitter and said receiver, wherein said first message comprises an on-line reconfiguration message for entering a layer two power saving mode.

11. A method as defined in claim 10, wherein said transmitting data at said reduced power and reduced rate is initialized via a second message between said transmitter and said receiver.

12. A method as defined in claim 11, wherein resuming said normal power and rate is initialized via a third message between said transmitter and said receiver, wherein said third message comprise an on-line reconfiguration message for exiting the layer two power saving mode.

13. A method as defined in claim 12, wherein said first, second, and third messages are transmitted in an overhead channel.

14. A method as defined in claim 1, wherein resuming said normal power and rate is initialized via a predefined waveform.

15. A method as defined in claim 1, wherein resuming said normal power and rate is initialized via a predefined bit sequence in a data channel.

16. A system for reducing power dissipation for data transmission in a digital subscriber line (DSL) system when a rate of available data is below a first predetermined data rate for a predetermined length of time, comprising:
   a central office asymmetric DSL termination unit (ATU-C); and
   a remote asymmetric DSL termination unit (ATU-R),
   wherein said ATU-C and said ATU-R are configured to operate protocols developed for on-line reconfiguration comprising additional on-line reconfiguration messages for entering and exiting layer two power saving mode; and
   wherein said ATU-C includes a first processor, said ATU-R includes a second processor, and at least one of said first and second processors is configured to execute processing comprising the steps of:
   storing normal parameters for a normal power and rate of said data transmission;
   calculating new parameters for reduced power and a reduced rate of said data transmission, wherein the new parameters comprise bits per carrier and gains per carrier, and wherein the calculation of new parameters is based upon a deterministic calculation;
   communicating said new parameters between said ATU-C and said ATU-R via an on-line reconfiguration message;
   transmitting data at said reduced power and reduced rate of said data transmission responsive to said new parameters, wherein said reduced rate requires less power for data transmission; and
   resuming said normal power and rate of said data transmission using said normal parameters when said rate of available data is above a second predetermined data rate, wherein said resuming said normal power and rate utilizes an on-line reconfiguration message for exiting the layer two power saving mode.

17. A system as defined in claim 16, wherein said new parameters are calculated by:
   determining an available bandwidth of said data transmission;
   calculating whether said available bandwidth is below a predefined threshold;
   reducing a number of said bits per carrier in accordance with said available bandwidth; and
   reducing a number of said gains per carrier in accordance with said reduced number of bits per carrier and said available bandwidth.

18. A system as defined in claim 17, wherein said bits per carrier and said gains per carrier are communicated between said ATU-C and said ATU-R via a first message between said ATU-C and said ATU-R, wherein said first message comprises an on-line reconfiguration message for entering a layer two power saving mode.

19. A system as defined in claim 18, wherein said transmitting data at said reduced power and reduced rate is initialized via a second message between said ATU-C and said ATU-R.

20. A system as defined in claim 19, wherein resuming said normal power and rate is initialized via a third message between said ATU-C and said ATU-R, wherein said third message comprise an on-line reconfiguration message for exiting the layer two power saving mode.

21. A system as defined in claim 20, wherein said first, second, and third messages are transmitted in an overhead channel.

* * * * *